Dec. 28, 1937. G. W. GARTNER 2,103,616
PERAMBULATOR
Filed Nov. 1, 1935 3 Sheets-Sheet 1

Inventor
George W. Gartner
By Hardway Cather
Attorneys

Dec. 28, 1937. G. W. GARTNER 2,103,616
PERAMBULATOR
Filed Nov. 1, 1935 3 Sheets-Sheet 2
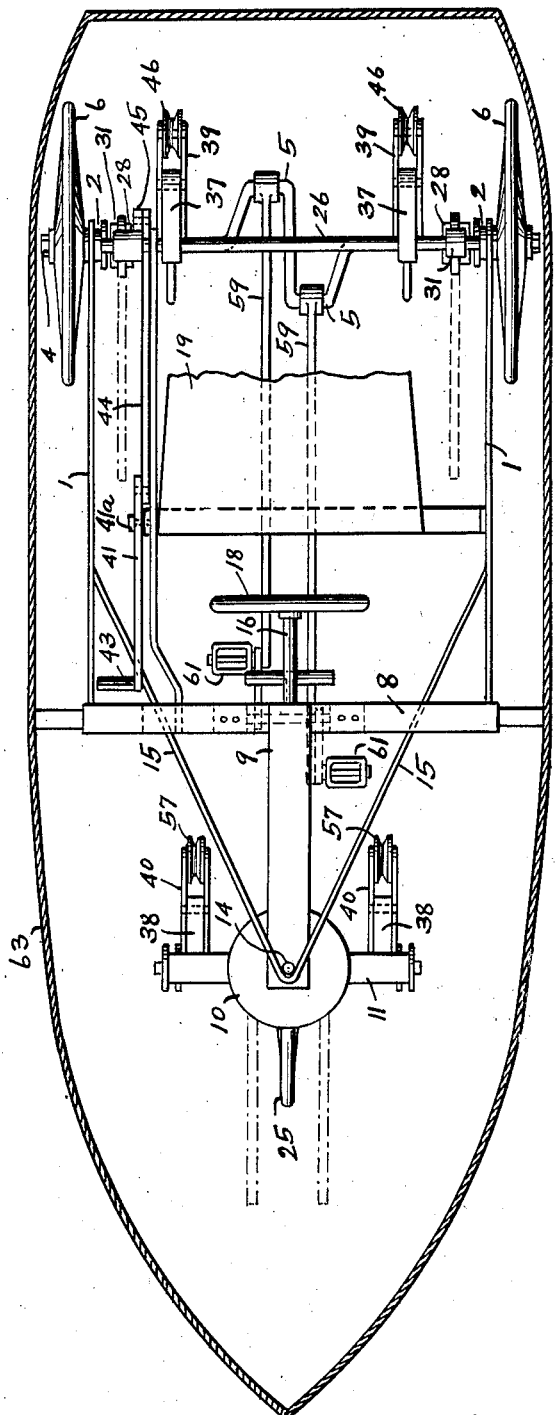
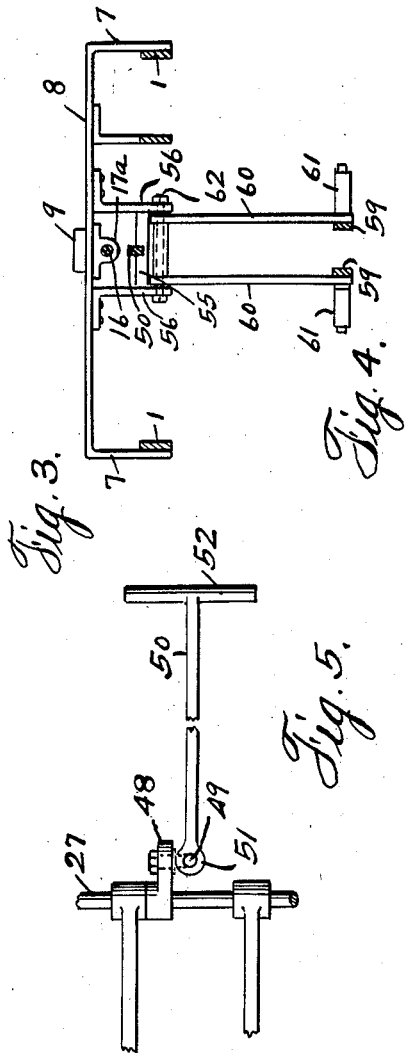
Inventor
George W. Gartner
By Hardway & Cathey
Attorneys Dec. 28, 1937.     G. W. GARTNER     2,103,616
PERAMBULATOR
Filed Nov. 1, 1935     3 Sheets-Sheet 3
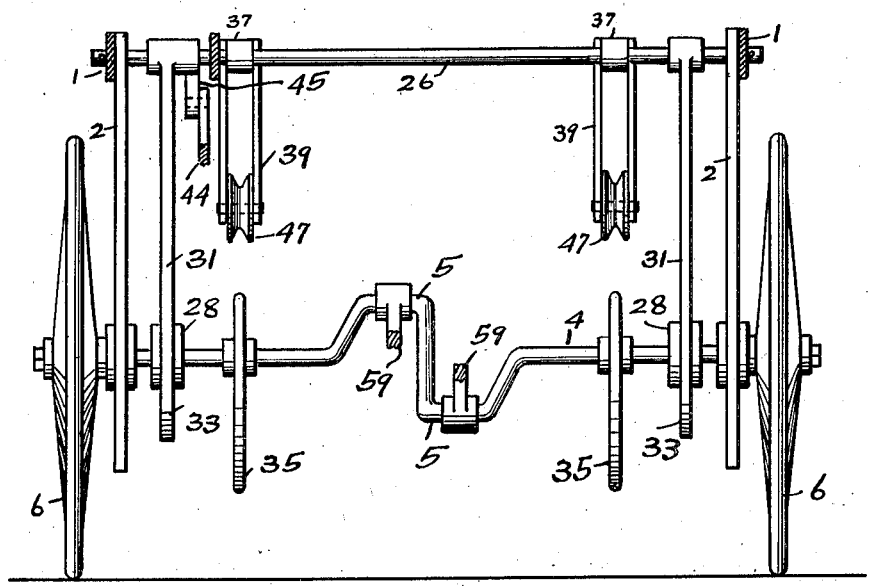
Fig. 6.
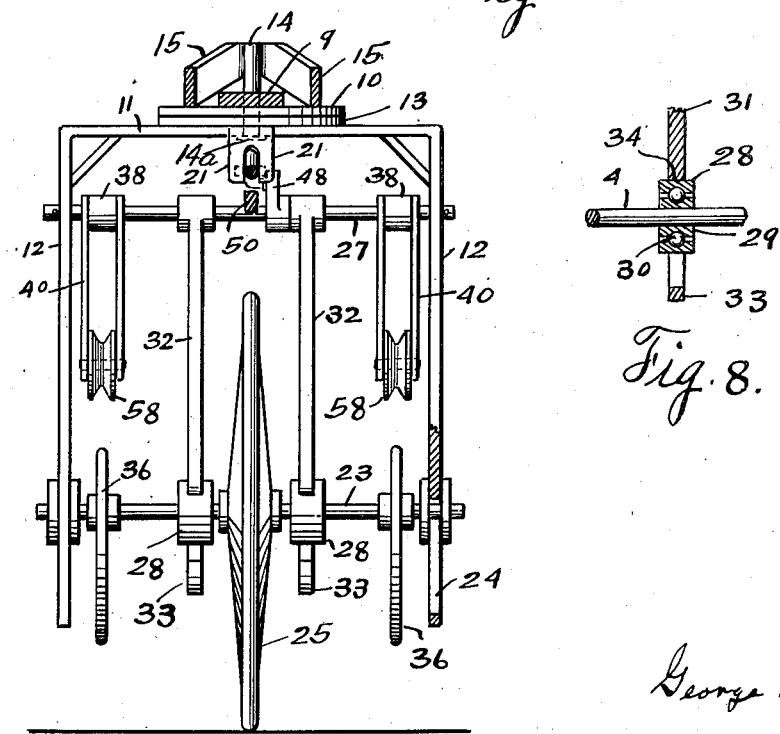
Fig. 7.
Fig. 8.
Inventor
George W. Gartner
By
Hardway & Cather
Attorneys Patented Dec. 28, 1937

2,103,616

UNITED STATES PATENT OFFICE 2,103,616

PERAMBULATOR

George W. Gartner, Houston, Tex.

Application November 1, 1935, Serial No. 47,756

11 Claims. (Cl. 280—223)

This invention relates to a perambulator.

An object of the invention is to provide a toy vehicle designed to be used by children and which may be readily propelled by the rider through the instrumentality of novel propelling means.

Another object is to provide a vehicle of the type described comprising a frame or chassis mounted on carrier wheels and having a seat for the rider, and propelling means for the traction wheels, the chassis being so mounted on the carrier wheels that it will move in parallel relation with the surface over which the vehicle is moving; said vehicle also embodying means under the control of the rider whereby the front end or rear end, or both, of the chassis may be caused to undulate as the vehicle moves along.

The body of the vehicle may be of any selected design and the mechanical arrangement may be varied within the principle of the invention.

With the above and other objects in view, this invention has particular relation to certain novel features of construction, operation, and arrangement of parts, an example of which is given in this specification and illustrated in the accompanying drawings, wherein:

Figure 3 shows a plan view, showing the body in section.

Figure 4 shows a sectional view taken on the line 4—4 of Figure 1.

Figure 5 shows a fragmentary plan view of the front shifting mechanism.

Figure 6 shows a vertical sectional view, taken on the line 6—6 of Figure 1.

Figure 7 shows a vertical sectional view taken on the line 7—7 of Figure 1, and, Figure 8 shows a fragmentary vertical sectional view of a type of bearing employed.

Figures 1, 2:
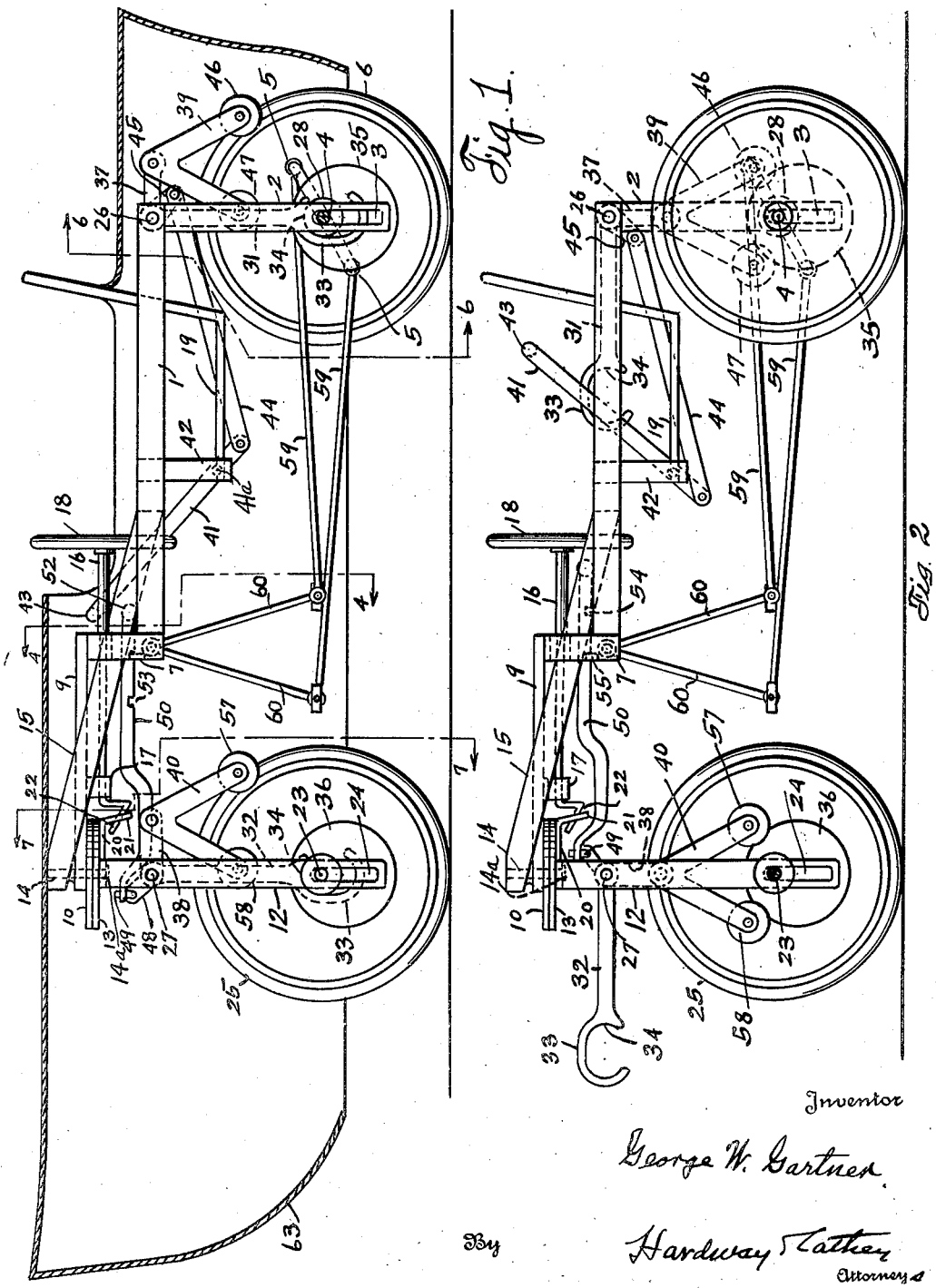
Figure 1 shows a side view, partly in section, of the vehicle, showing the frame mounted on the carrier wheels to move parallel to the supporting surface, and showing the body in section.
Figure 2 shows a side view showing the mounting shifted to cause the frame to undulate as the vehicle moves along.

Referring now more particularly to the drawings, wherein like numerals of reference designate similar parts in each of the figures, the numerals 1, 1, designate the side members of the main frame which are supported, at their rear ends, by the legs 2, 2. The lower ends of these legs have the vertical slots 3, 3, to receive the ends of the rear axle 4. This axle is formed with the cranks 5, 5, and is supported by the traction wheels 6, 6, which are fixed on the ends thereof.

The forward ends of the side members 1 are secured to the side bars 7, 7, of the inverted U-shaped cross-bar 8, and secured to, and extended forwardly from the bar 8, there is a reach 9 whose forward end is fastened to the circular bearing disc 10.

There is a front frame comprising the cross-bar 11 and the depending side bars 12, 12, secured to the cross-bar 11. Fastened to the cross-bar 11 there is a lower bearing disc 13, on which the upper bearing disc 10 rides. A linch pin 14 extends upwardly through the cross-bar 11, as well as through the plates, or discs, 13, and 10, and forms a pivot about which the disc 13 turns on a vertical axis. This bolt has a head 14a which engages the underside of the bar 11 as shown in Figures 1, 2 and 7. A V-bar has the rear ends of its side arms 15, 15, welded to the side members 1, said side arms 15 converging forwardly underneath the cross-bar 8, and forming a loop about the pin 14 and being welded thereto.

There is a rearwardly extended steering shaft 16 which works in the longitudinal bearings 17 and 17a secured underneath the reach 9 and cross-bar 8, respectively. The rear end of the shaft 16 has a steering wheel 18 secured thereon and accessible to the rider located on the seat 19. This seat is suitably swung from the frame of the vehicle. Depending from the rear side of the lower disc 13 there is the yoke 20 having the spaced prongs 21, 21, and the forward end of the steering shaft 16 has the offset finger 22 which works between the prongs 21, whereby upon turning of the steering shaft 16, the disc 13 and front frame will be correspondingly turned and the vehicle steered.

There is a front axle 23 which works through the vertical slots 24, 24, of the side bars 12, and fixed on this axle there is a central steering wheel 25.

There are the rear and front transverse shafts 26 and 27, the former of which has end bearings in the main frame, and the latter of which has end bearings in the side bars 12. On the rear and front axles are the anti-friction bearing assemblies comprising the inner raceways, as 29, fixed to the axles, the outer raceways 28 and the bearings 30 between said raceways. Fixed to, and depending from, the rear and front shafts 26, 27, are the supporting legs 31, 31, and 32, 32 which carry said outer raceways 28. The lower ends of these legs are formed with open links, or C-hooks 33, whose upper ends are formed into arcuate bearings 34 which rest on the outer raceways 28, whereby the entire framework is supported on the axles, and when so supported, the vehicle will move along in a regular course, horizontally.

Fixed on the front and rear axles there are also the eccentric discs 35, 35, and 36, 36. The rear and front shafts 26 and 27 have the rearwardly extended arms 37, 37, and 38, 38, respectively, fixed thereto. Swinging from the free ends of these arms are the angle frames 39, 39, and 40, 40. There is a hand lever 41 pivoted at the point 41a to a seat hanger 42, which depends from the main frame and the forward end of this lever has a hand grip 43. The rear end of the lever 41 is pivoted to the forward end of the link 44 and the rear end of this link is pivoted to the free end of an arm 45 which is fixed to and depends from the rear shaft 26.

When the lever 41 is actuated rearwardly, a forward pull will be exerted, through the link 44, on the arm 45, and the shaft 26 will be correspondingly turned. The arms 31 will thus be swung forwardly, unseating the bearings 34 from the rear raceways 28, and at the same time swinging the frames 39 downwardly. These frames 39 carry the front and rear grooved wheels 46 and 47, and when the frames 39 are lowered, these wheels 46, 47, ride upon the eccentric discs 35 and accordingly as the rear axle 4 rotates, the rear end of the vehicle framework will be oscillated up and down as the vehicle moves.

Upstanding from the front transverse shaft 27, there is an arm 48 which is fixed to said shaft. Bolted to the free end of said arm 48, there is an upwardly turned finger 49. A shift bar 50 has its forward end formed into an eye 51 which engages over the finger 49 and the rear end of the bar 50 is formed with a grip member 52 accessible to the rider. The under side of the bar 50 has the front and rear notches 53, and 54, engageable over a cross-bar 55. This cross-bar has its ends secured to the spaced brackets 56, 56, which are secured to and depend from the cross-bar 8.

When the notch 54 is engaged over the cross-bar 55, with the shift bar 50, in its forward position, the arms 32, 32, will depend vertically from the shaft 27 and their bearings 34 will ride on the outer front raceways 28, thus supporting the forward end of the vehicle framework. If the notch 54 be unseated from the cross-bar 55 and the shift bar 50 pulled rearwardly, the arm 48 will be correspondingly swung rearwardly, rotating the shaft 27, and swinging the arms 32 into horizontal position, as shown in Figure 2. At the same time the frames 40 will be swung downwardly. These frames carry the front and rear grooved wheels 57, 58, and when the frames 40 are lowered, said grooved wheels will ride upon the discs 36, 36, on the front axle 23 and support the front end of the framework, and as the vehicle moves, the rotation of the discs 36, 36, will impart an undulatory motion to the forward end of the vehicle frame, and the notch 53 may be engaged over the cross bar 55 and the shift bar 40 maintained in said rear position.

As shown, the cams 35, 36, are in the same relation to the axles, and when in this position, if the framework is supported on said cams, as hereinabove explained, the rear and front ends of the framework will move up and down together. However, one set of cams may be adjusted to a position the reverse of that of the other, in which event, if the framework is supported on said cams, the front and rear ends of the framework will move up and down alternately.

The vehicle may be propelled in the conventional manner by means of the connecting rods 59, 59, whose rear ends have bearings on the cranks 5, 5 of the rear axle, and whose forward ends are pivoted to the lower ends of the hangers 60, 60. These hangers have the pedals 61, 61, mounted on their lower ends, and their upper ends are pivoted on the cross-pin 62, which is fitted in bearings in the brackets 56. The pedals 61 are located conveniently in front of the rider's seat 19.

The vehicle may have a body, as 63, if desired, which may be of any selected shape, a body having the outlines of a boat being shown.

The drawings and description disclose what is now considered to be a preferred form of the invention by way of illustration only, while the broad principle of the invention will be defined by the appended claims.

What I claim is:

1. A vehicle comprising a frame, axles on which the frame is mounted, ground wheels supporting the axles, means for mounting the frame on the axles, and selectively shiftable lever operated means to impart an undulating movement to the frame upon movement of the vehicle.

2. A vehicle comprising a frame, ground wheels, means for mounting the frame on the wheels, said means being shiftable by hand operable means within the vehicle to one position to allow a uniform movement of the frame relative to the supporting surface and to another position to cause an undulating movement of the frame relative to said surface, upon advance movement of the vehicle.

3. A vehicle comprising a frame, axles supporting the frame, ground wheels supporting the axles, means for supporting the frame whereby the frame will move in parallel relation with the supporting surface for the vehicle as the vehicle advances, means controllable within the vehicle for supporting the frame whereby the frame will be caused to undulate as the vehicle advances.

4. A vehicle comprising a frame, axles supporting the frame, ground wheels supporting the axles, means for supporting the frame whereby the frame will move in parallel relation with the supporting surface for the vehicle as the vehicle advances, selectively shiftable means within the vehicle for supporting the frame whereby the frame will be caused to undulate as the vehicle advances, and means for manually advancing the vehicle.

5. A vehicle comprising a frame, axles supporting the frame, ground wheels supporting the axles, means for supporting the frame whereby the frame will move in parallel relation with the supporting surface for the vehicle as the vehicle advances, lever controlled means for supporting the frame whereby the frame will be caused to undulate as the vehicle advances when shifted into active position, and means for advancing the vehicle.

6. A vehicle comprising a frame, axles supporting the frame, ground wheels supporting the axles, means for supporting the frame whereby the frame will move in parallel relation with the supporting surface for the vehicle as the vehicle advances, means for supporting the frame whereby the frame will be caused to undulate as the vehicle advances, and lever controlled means for selectively shifting the supporting means to vary the movements of the frame relative to said surface.

7. A vehicle comprising a frame, axles supporting the frame, ground wheels supporting the axles, means for supporting the frame whereby the frame will move in parallel relation with the supporting surface for the vehicle as the vehicle advances, means for supporting the frame whereby the frame will be caused to undulate as the vehicle advances, means controllable by a seated passenger for selectively shifting the supporting means to vary the movements of the frame relative to said surface and means for advancing the vehicle.

8. A vehicle comprising a framework, a front and rear axle, traction wheels fixed on one axle and a steering wheel fixed on the other axle, bearings concentrically mounted on the axles, bearings eccentrically mounted on the axles, supporting means for supporting the frame on the concentric bearings, supporting means for supporting the frame on the eccentric bearings, and means for selectively shifting the respective supporting means into supporting, or non-supporting position.

9. A vehicle comprising a supporting frame, a front axle and a rear axle for supporting the frame, front and rear wheels supporting the respective axles, eccentric bearings on the axles, means for shiftably mounting the frame on said bearings whereby either or both ends of the frame may be caused to undulate as the vehicle advances.

10. A vehicle comprising a supporting frame, a front axle and a rear axle for supporting the frame, front and rear wheels supporting the respective axles, eccentric bearings on the axles, means for shiftably mounting the frame on said bearings whereby either or both ends of the frame may be caused to undulate as the vehicle advances, and means for advancing the vehicle.

11. A vehicle comprising a chassis, a wheeled carriage, means for mounting the chassis on the carriage, comprising bearings on the carriage, concentric and eccentric, respectively, with the wheels, and selectively shiftable supports on the chassis arranged to be shifted, alternatively, into supporting position on the respective bearings.

GEORGE W. GARTNER.